United States Patent
Chien et al.

(10) Patent No.: US 8,634,979 B2
(45) Date of Patent: Jan. 21, 2014

(54) DRIVE DEVICE AND DRIVE CONTROL METHOD FOR ELECTRIC BICYCLE

(75) Inventors: Shih-Hsiang Chien, Hsinchu (TW); Shih-Hsin Hsu, Hsinchu (TW); Tian-Hua Liu, Hsinchu (TW); Jui-Ling Chen, Hsinchu (TW); Yi-Hsuan Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/526,219

(22) Filed: Jun. 18, 2012

(65) Prior Publication Data
US 2013/0138281 A1 May 30, 2013

(30) Foreign Application Priority Data
Nov. 30, 2011 (TW) ............... 100143885 A (51) Int. Cl.
*A63B 22/08* (2006.01)
*A63B 22/00* (2006.01)
*A63B 69/16* (2006.01)
*B62K 3/00* (2006.01)

(52) U.S. Cl.
USPC ........... 701/22; 701/490; 280/282; 482/57

(58) Field of Classification Search
CPC . A63B 23/0476; A63B 69/16; B62K 2003/00
USPC ........... 280/281.1, 282–288, 288.1, 288.2, 280/288.3, 418, 482; 701/22, 490; 482/51, 482/57–65; 188/2 R
See application file for complete search history.

(56) References Cited

U.S. PATENT DOCUMENTS 5,266,065 A 11/1993 Ancarani Restelli
5,758,736 A 6/1998 Yamauchi
(Continued)

FOREIGN PATENT DOCUMENTS

| TW | 381997 B | 2/2000 |
| TW | 470037 U | 12/2001 |
| TW | 572838 B | 1/2004 |
| TW | M324630 U | 1/2008 |

OTHER PUBLICATIONS

Lai et al., "Novel-back-EMF detection technique of bruchless DC motor dricves for wide range control without using current", IEEE Transactions on Power Electronics, vol. 23, No. 2, pp. 934-940, Mar. 2008.

(Continued)

*Primary Examiner* — Mary Cheung
*Assistant Examiner* — Atul Trivedi
(74) *Attorney, Agent, or Firm* — Rabin & Berdo, P.C.

(57) ABSTRACT

A drive device and a drive control method for the electric bicycle are disclosed. The drive device of the electric bicycle is equipped with a power supply/storage unit, a compact motor, an inclination sensor, a brake actuation sensor, a pedal-rotating speed sensor and a drive control module. The drive device performs integrated calculations using the inclination information of the inclination sensor, the brake actuation information of the brake actuation sensor and the pedal-rotating speed information of the pedal-rotating speed sensor, so the drive control modules instructs the compact motor and the power supply/storage unit to quickly enter an auxiliary drive mode for rotating wheels of the electric bicycle, or to enter an energy recovery mode for storing electrical energy generated by the compact motor.

19 Claims, 9 Drawing Sheets

(56) References Cited

U.S. PATENT DOCUMENTS

| | | | |
|---|---|---|---|
| 5,857,537 | A | 1/1999 | Matsumoto et al. |
| 6,131,683 | A | 10/2000 | Wada |
| 6,412,800 | B1 | 7/2002 | Tommei |
| 7,185,726 | B2 | 3/2007 | Young |
| 2004/0163870 | A1* | 8/2004 | Liao et al. ............... 180/220 |
| 2005/0246152 | A1* | 11/2005 | Kokatsu et al. ............ 703/22 |
| 2006/0094569 | A1* | 5/2006 | Day ............................. 482/57 |
| 2008/0071436 | A1* | 3/2008 | Dube et al. ................. 701/22 |
| 2009/0286654 | A1* | 11/2009 | Rice ............................. 482/4 |
| 2010/0113223 | A1* | 5/2010 | Chiles et al. ................. 482/5 |
| 2011/0144841 | A1* | 6/2011 | Ruben ......................... 701/22 |
| 2011/0303474 | A1* | 12/2011 | Kimmich et al. ......... 180/206.3 |

OTHER PUBLICATIONS

Yang et al., "A Cost-Effective Mthod of Electric Brake With Energy Regeneration for Electric Vehicles", IEEE Transactions on Industrial Electronics, vol. 56, No. 6, pp. 2203-2212, Jun. 2009.

Lai et ail.,"Regenerative Breaking Control Strategies of Switched Reluctance Machine of Electric Bicycle", IEEE Transactions on Power Electronics, vol. 23, No. 2, pp. 934-940, Mar. 2008.

Raute et al., "Sensorless Permanent magnet AC motor Drive with near zero-speed operation for electric-assisted bicycle", Power Electronics and Applications, 2005 European Conference on, pp. 5024-5033, 2005.

* cited by examiner

DRIVE DEVICE AND DRIVE CONTROL METHOD FOR ELECTRIC BICYCLE

CROSS-REFERENCE TO RELATED APPLICATIONS

This application claims priority to Taiwanese Patent Application No. 100143885, filed on Nov. 30, 2011.

FIELD

This disclosure relates to a drive control technique for electric bicycles, and more particularly, to an efficient drive and energy recovery technique with active energy recovery and complementary switch control.

BACKGROUND

Figure 1:
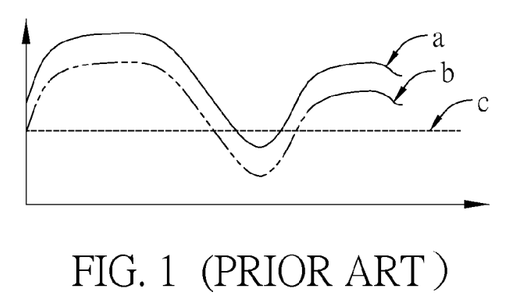
FIG. 1 is a graph illustrating auxiliary power in the prior art.

Traditional auxiliary-force control methods for electric bicycles provide auxiliary force for the pedaling force of a user when output power based on torque. As shown in FIG. 1, a user pedaling-force line a indicates the pedaling force exerted by the user, and auxiliary-force line b indicates the auxiliary force provided by a torque sensing device based on the pedaling force.

However, the torque sensing device is vulnerable to vibrations, impact, moisture and the like and may result in sensing errors. In addition, the torque-sensing device tends to be heavy, which consumes more auxiliary power and user's physical strength. Further, the torque-sensing device also requires frequent calibration by maintenance personnel in order to maintain accuracies up to standard. Moreover, a typical mechanical torque-sensing device has the characteristic of signal delay, so users cannot immediately receive the desired auxiliary power. Most importantly, the torque sensing device is much more expensive than a pedal-rotating speed sensor, which is a burden for both manufacturers and consumers.

Auxiliary power of electric bicycles may also be provided based on sensing by the pedal-rotating speed sensor, as shown by auxiliary-power line c in FIG. 1. However, it can be seen from FIG. 1, in the case of providing auxiliary power based on sensing by the pedal-rotating speed sensor, auxiliary power cannot be automatically adjusted according to the change in the slopes of the roads. As a result, too much or too little power may sometimes be provided, such that the users may not be able to pedal smoothly and energy is wasted.

In the other aspect, traditional energy recovery control techniques for electric bicycles are mostly achieved through flywheel diodes. However, if recovery time becomes long, power loss will also increase, so energy may be dissipated in the form of heat, rendering a poor recovery result.

Taiwan Patent Nos. 381997, 572838, M324630 and 470037 are prior arts related to auxiliary power techniques, wherein Patent No. 381997 provides auxiliary power output by the transmission principle of a planetary gear set of double input shafts in conjunction with motor rotation speed controller; Patent No. 572838 provides an energy-feedback electric vehicle with non-contact auxiliary brake device, which controls reverse current of the motor by switching power transistors such that excessive kinetic energy is converted into electrical energy; Patent No. M324630 proposes using gear tachometer in conjunction with a torque sensor as the input control signals for the motor, as well as techniques for displaying information such as assist rate, mode, speed, mileage etc.; and No. 470037 proposes a technique for processing received ride information in order to provide appropriate auxiliary power to users.

In addition, U.S. Pat. Nos. 6,131,683, 5,857,537, 6,412,800 and 7,185,726 also disclose techniques related to auxiliary power, wherein U.S. Pat. No. 6,131,683 combines a control circuit, a speed/torque sensor and a speed reduction mechanism for driving the wheels; U.S. Pat. No. 5,857,537 proposes driving the wheels by motor inside the wheels; U.S. Pat. No. 6,412,800 relates to a modular design of mechanisms such as an electric motor, a controller and a speed change gear set; and U.S. Pat. No. 7,185,726 discloses providing a driving unit and related connection mechanisms in the rear panniers of the bicycle.

However, only a few of these prior arts use rotating speed sensors for providing motor driving signal, and most of them use torque sensing devices for providing motor driving signal, and drive the transmission system in conjunction with the design of gear sets. Such approaches cannot avoid the various shortcomings of the torque-sensing device as mentioned earlier. Moreover, these Taiwan and United State patents fail to offer good performance in terms of energy recovery.

SUMMARY

In light of the foregoing drawbacks, an objective of this disclosure is to provide a drive device and method for electric bicycles that provides appropriate assistant power according to the slope of the rode and performs efficient energy recovery.

In accordance with the above and other objectives, this disclosure provides a drive device for an electric bicycle, which includes: a power supply/storage unit for providing and storing electrical energy; a compact motor provided on a wheel or a chainring of the electric bicycle and electrically connected with the power supply/storage unit; an inclination sensor for sensing inclination information of the electric bicycle with respect to a horizontal plane; a brake actuation sensor for sensing brake actuation information in response to braking of the electric bicycle; a pedal-rotating speed sensor for sensing pedal-rotating speed information in response to pedaling of the electric bicycle; and a drive control module for performing integrated calculations on the inclination information, the brake actuation information and the pedal-rotating speed information and instructing the compact motor and the power supply/storage unit to enter an auxiliary drive mode or an energy recovery mode, wherein, in the auxiliary drive mode, the compact motor and the power supply/storage unit drive wheels of the electric bicycle, and in the energy recovery mode, the power supply/storage unit stores electrical energy generated by the compact motor.

This disclosure further provides a drive control method for an electric bicycle equipped with a power supply/storage unit and a compact motor. The power supply/storage unit and the compact motor work in cooperation to drive wheels of the electric bicycle. The method includes the following steps of: (1) when the pedal-rotating speed of the electric bicycle exceeds a predetermined activation condition, detecting an inclination of the electric bicycle with respect to a horizontal plane; (2) determining a riding mode of the electric bicycle based on the inclination angle and outputting a corresponding duty cycle or modulation parameter; (3) detecting Hall signals corresponding to location status of the compact motor and further performing calculations based on the Hall signals, the duty cycle and predetermined time count information or based on the Hall signals, the modulation parameter and predetermined time count information, so as to output corresponding switch triggering information for completing switch setting; (4) making corresponding modulations to the compact motor and the power supply/storage unit based on the switch triggering information to allow the compact motor and the power supply/storage unit to enter an auxiliary drive mode for driving wheels of the electric bicycle or enter an energy recovery mode for storing electrical energy generated by the compact motor.

Compared to the prior art, the drive device and method for an electric bicycle performs integrated calculations using the inclination information, the brake actuation information and/or pedal-rotating speed information to allow the compact motor and the power supply/storage unit to quickly enter the auxiliary drive mode for rotating the wheels of the electric bicycle, or to enter the energy recovery mode for storing electrical energy generated by the compact motor. As a result, various shortcomings in association with the prior art that uses a torque-sensing device are avoided, and appropriate assistant power according to the slope of the road the electric bicycle can be flexibly provided, while achieving higher energy recovery rate.

BRIEF DESCRIPTION OF THE DRAWINGS

This disclosure can be more fully understood by reading the following detailed description of the preferred embodiments, with reference made to the accompanying drawings, wherein.

DETAILED DESCRIPTION OF THE EMBODIMENTS

This disclosure is described by the following specific embodiments. Those with ordinary skills in the arts can readily understand the other advantages and functions of this disclosure after reading the disclosure of this specification. This disclosure can also be implemented with different embodiments. Various details described in this specification can be modified based on different viewpoints and applications without departing from the scope of this disclosure.

Figure 2:
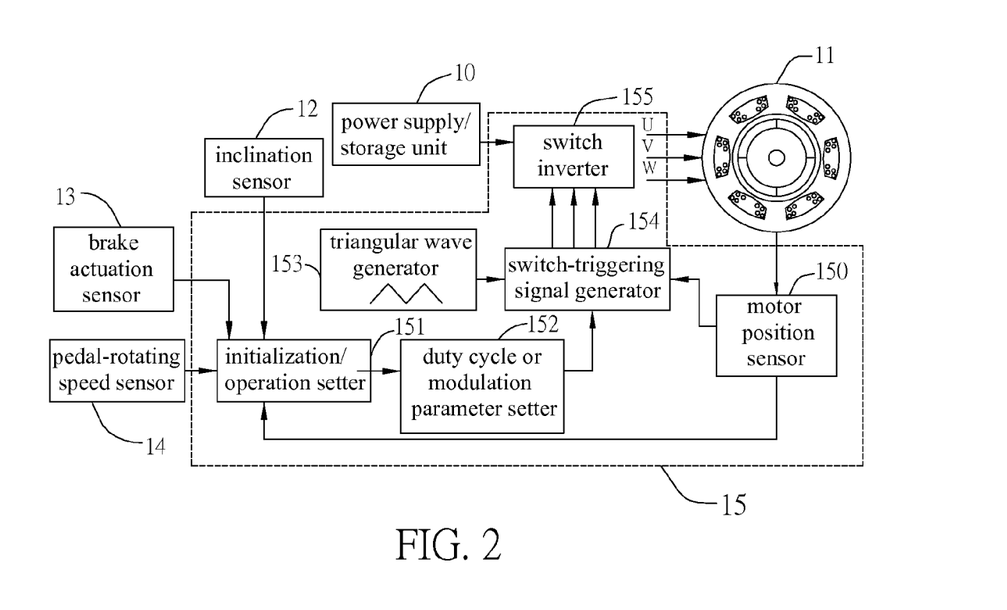
FIG. 2 is a block diagram illustrating a drive device for an electric bicycle according to an embodiment of this disclosure.
Figures 3A, 3B:
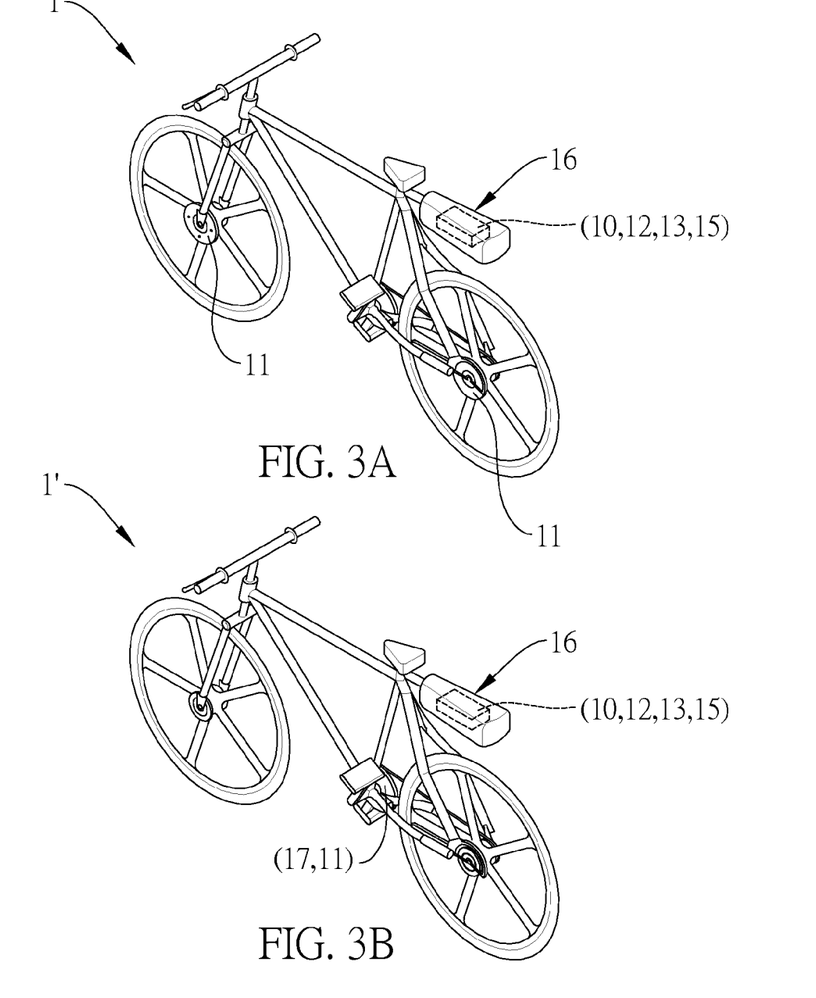
FIG. 3A is a schematic diagram depicting an overall structure of the drive device for an electric bicycle according to an embodiment of this disclosure.
FIG. 3B is a schematic diagram depicting another overall structure of the drive device for an electric bicycle according to an embodiment of this disclosure.
Figure 4:
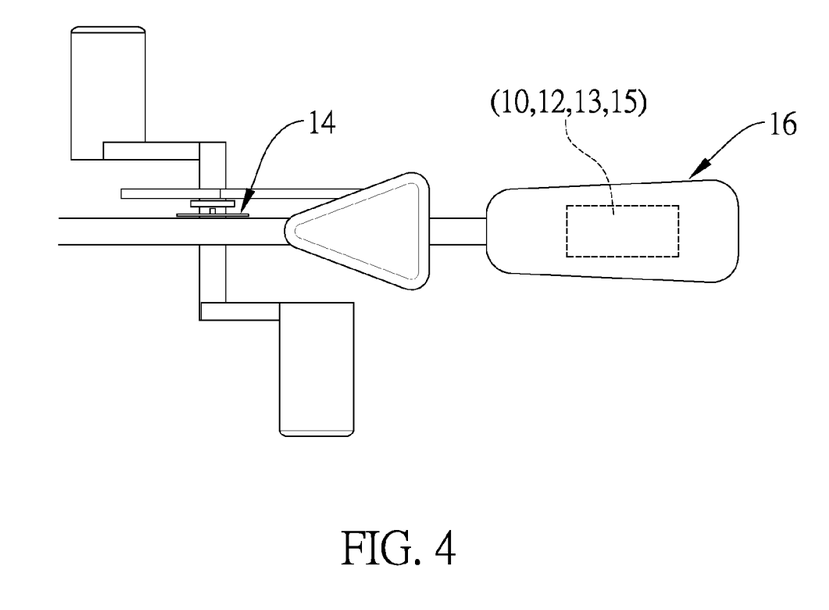
FIG. 4 is a schematic diagram depicting partial structure of the drive device for an electric bicycle according to an embodiment of this disclosure.
Figure 5A:
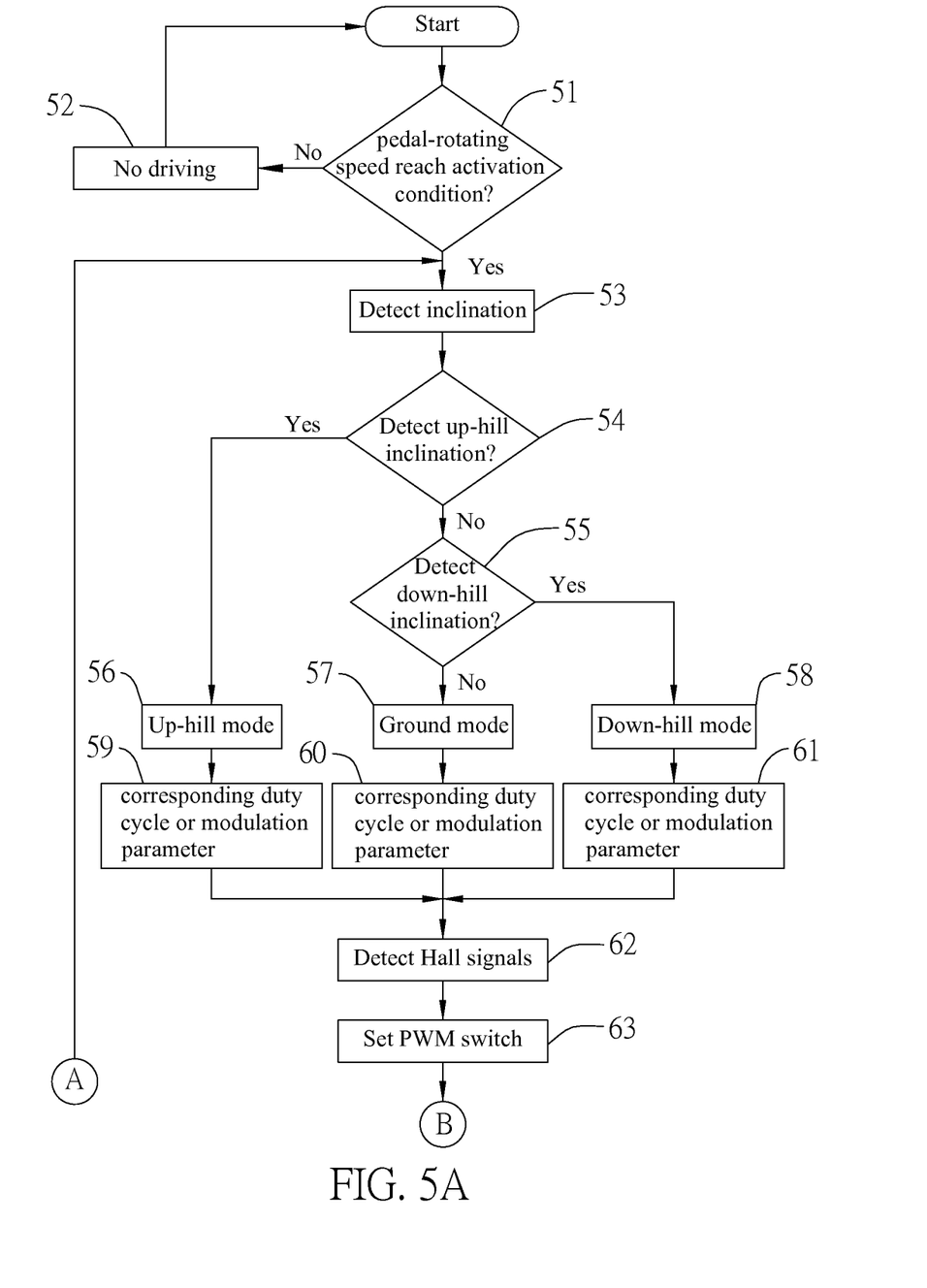
FIGS. 5A and 5B are flowcharts illustrating a driving method for an electric bicycle according to an embodiment of this disclosure.
Figure 5B:
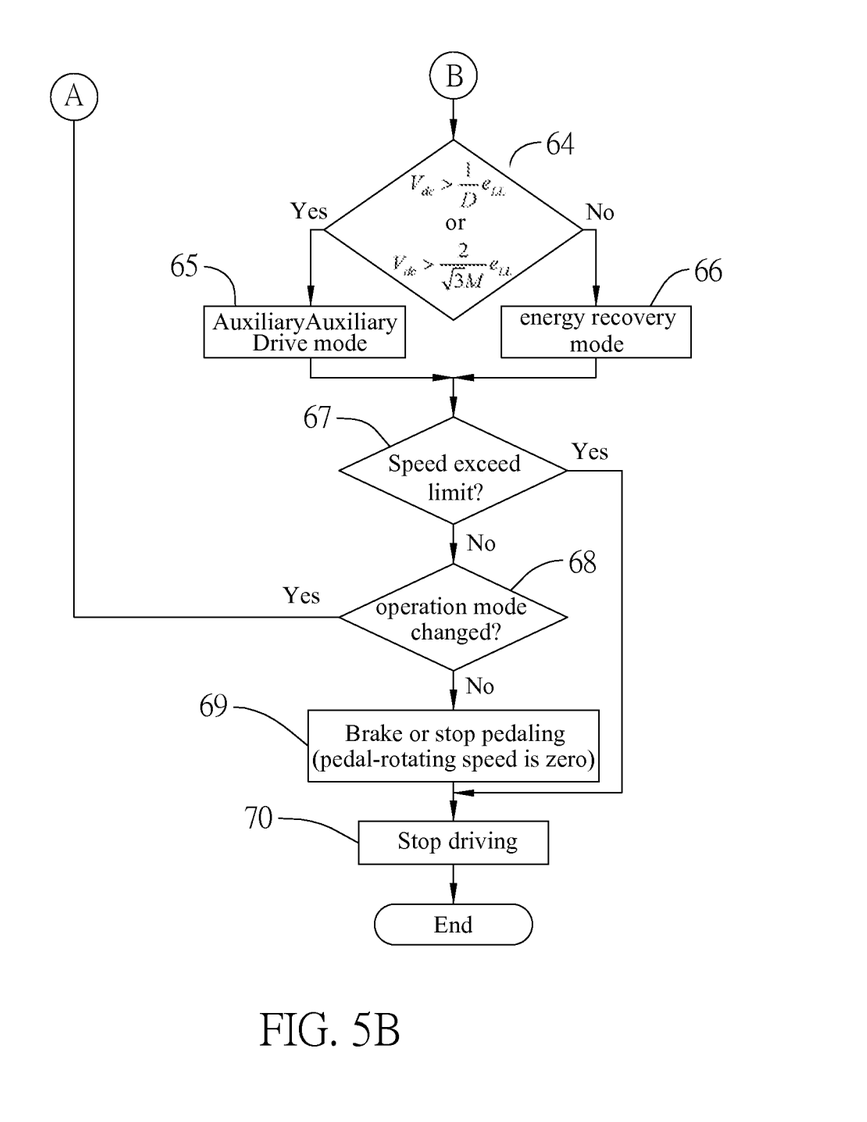
Figure 6:
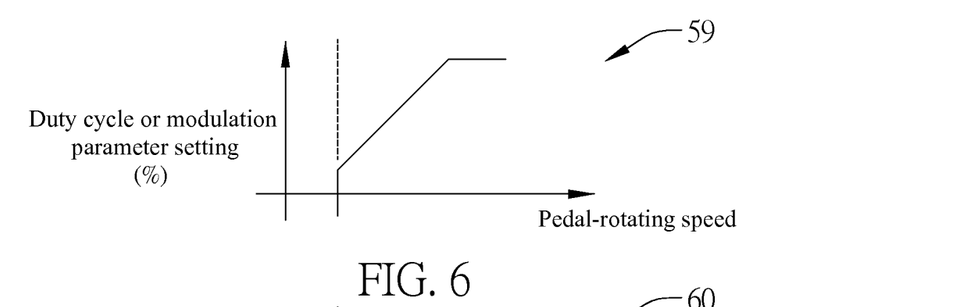
FIG. 6 is a graph illustrating the duty cycle or modulation parameter in an up-hill mode.
Figure 7:
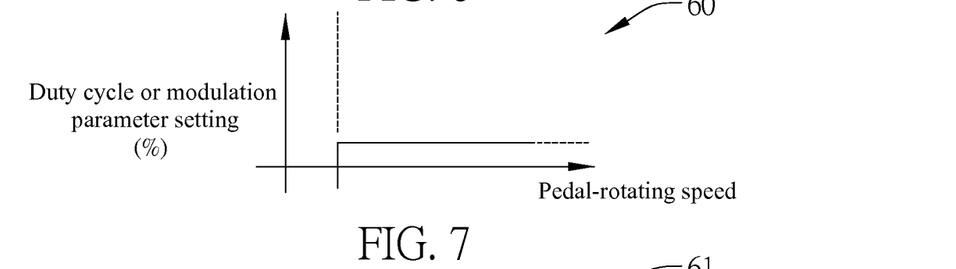
FIG. 7 is a graph illustrating the duty cycle or modulation parameter in a down-hill mode.
Figure 8:
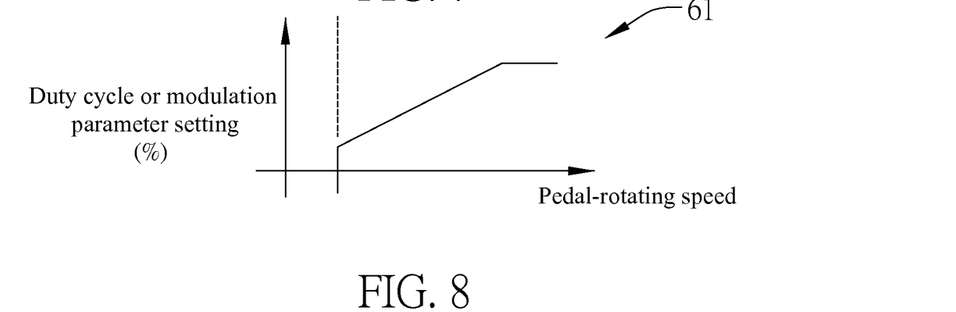
FIG. 8 is a graph illustrating the duty cycle or modulation parameter in a ground mode.
Figure 9:
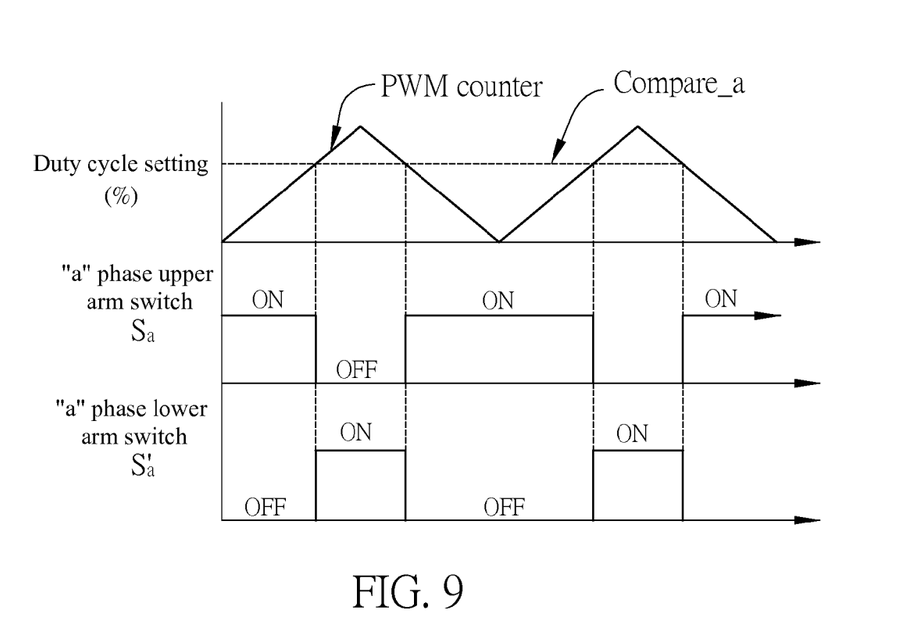
FIG. 9 is a graph illustrating switching of complementary switches and setting of the duty cycle.
Figure 10:
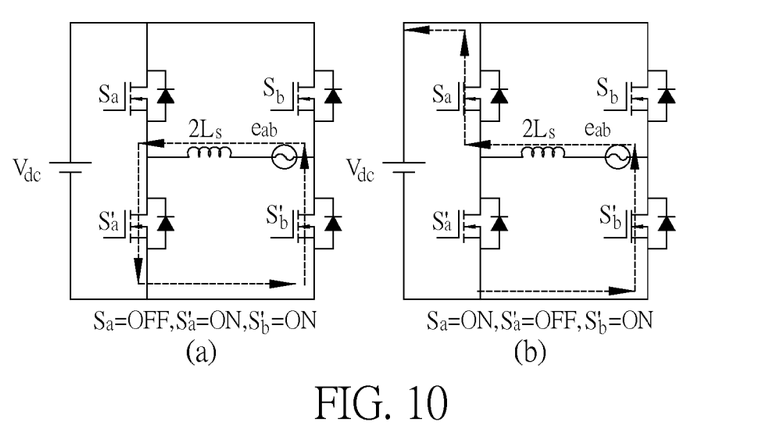
FIG. 10 is a diagram illustrating an energy recovery circuit for the drive device of an electric bicycle according to an embodiment of this disclosure.

In order to understand a drive device and driving method for an electric bicycle according to this disclosure, FIG. 2 shows a block diagram illustrating the drive device for an electric bicycle according to this disclosure; FIG. 3A shows a schematic diagram depicting an overall structure of the drive device for an electric bicycle according to this disclosure; FIG. 3B shows a schematic diagram depicting another overall structure of the drive device for an electric bicycle according to this disclosure; FIG. 4 shows a schematic diagram depicting partial structure of the drive device for an electric bicycle according to this disclosure; FIGS. 5A and 5B show flowcharts illustrating the driving method for an electric bicycle according to this disclosure; FIG. 6 shows a graph illustrating the duty cycle or modulation parameter in an up-hill mode; FIG. 7 shows a graph illustrating the duty cycle or modulation parameter in a down-hill mode; FIG. 8 shows a graph illustrating the duty cycle or modulation parameter in a ground mode; FIG. 9 shows a graph illustrating switching of complementary switches and setting of the duty cycle; and FIG. 10 shows a diagram illustrating an energy recovery circuit for the drive device of an electric bicycle according to this disclosure.

As shown, electric bicycles 1 and 1' each includes a power supply/storage unit 10, a compact motor 11, an inclination sensor 12, a brake actuation sensor 13, a pedal-rotating speed sensor 14 and a drive control module 15. The drive control module 15 includes a motor position sensor 150, an initialization/operation setter 151, a duty cycle or modulation parameter setter 152, a triangular wave generator 153, a switch-triggering signal generator 154 and a switch inverter 155.

Figure 3C:
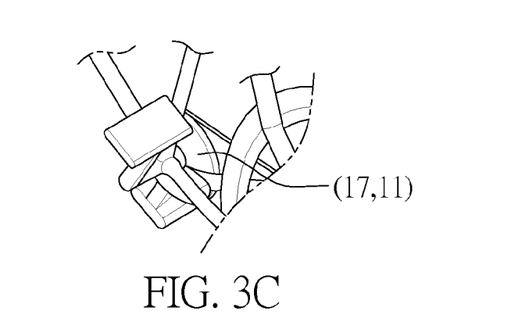
FIG. 3C is a schematic diagram depicting an enlarged part of FIG. 3B.

The power supply/storage unit 10 is used for supplying and storing electrical energy, and the electrical energy stored by the power supply storage 10 can be provided in the form of DC power. The compact motor 11 is electrically connected with the power supply/storage unit 10 and provided at the wheels (e.g. at the front or back wheel) of the electric bicycle 1 for directly driving the rotation of the wheels as shown in FIG. 3A. In the embodiment of FIG. 3A, the compact motor 11 can be designed as a built-in motor provided on the axle of the front or back wheel. In the embodiment of FIG. 3A, the compact motor 11 can also be designed as a permanent magnet synchronous motor. It should be noted that the implementation in FIG. 3A can also be modified to the implementation shown in FIG. 3B and FIG. 3C. That is, the compact motor 11 can be modified to be integrally formed with a chainring 17 for indirectly driving the rotation of the wheel through a chain or belt.

The inclination sensor 12 is used for sensing inclination information of the electric bicycle 1 with respect to the horizontal plane, such as a level or an inclinometer. The brake actuation sensor 13 is used for sensing brake actuation information of a brake of the electric bicycle 1. The pedal-rotating speed sensor 14 is used for sensing pedal-rotating speed information of pedals of the electric bicycle 1. In this embodiment, the pedal-rotating speed sensor 14 can be provided on a crankshaft of the electric bicycle 1 as shown in FIG. 4.

The drive control module 15 is used for performing integrated computations on the pedal-rotating speed information, the brake actuation information and the inclination information and instructing the compact motor 11 and the power supply/storage unit 10 to enter an auxiliary drive mode based on the result of the integrated computations so as to rotate the wheels of the electric bicycle 1. Alternatively, the drive control module 15 instructs the compact motor 11 and the power supply/storage unit 10 to enter an electrical energy recovery mode for storing the electrical energy generated by the compact motor 11 from rotations of the wheels. In this embodiment, the power supply/storage unit 10, inclination sensor 12, brake actuation sensor 13 or drive control module 15 can be selectively integrated into a control box 16, which is installed on the frame of the electric bicycle 1.

More specifically, the motor position sensor 150 of the drive control module 15 is used for sensing location status of the compact motor 11 and outputting corresponding Hall signals. The initialization/operation setter 151 of the drive control module 15 is electrically connected with the inclination sensor 12, brake actuation sensor 13, pedal-rotating speed sensor 14 and motor position sensor 150 for determining a duty cycle value or a modulation parameter value for a riding mode of the electric bicycle 1 based on the inclination information and pedal-rotating speed information, and upon receiving the brake actuation information or when the speed of the electric bicycle 1 is greater than a certain limit, stops the driving of the wheels of the electric bicycle 1 by the compact motor 11 and the power supply/storage unit 10.

In addition, the duty cycle or modulation parameter setter 152 of the drive control module 15 is electrically connected with the initialization/operation setter 151 so as to generate duty cycle information based on the duty cycle determined by the initialization/operation setter 151, for example, to set the duty cycle or modulation parameter to 0~100%. The triangular wave generator 153 of the drive control module 15 is used for outputting time count information required by subsequent pulse width modulation (PWM). The switch-triggering signal generator 154 of the drive control module 15 is electrically connected to the motor position sensor 150, duty cycle or modulation parameter setter 152 and triangular wave generator 153 to perform relevant calculations on the Hall signals generated by the motor position sensor 150, the duty cycle information or modulation parameter information generated by the duty cycle or modulation parameter setter 152 and the time count information generated by the triangular wave generator 153 so as to output corresponding switch triggering information, thereby completing switch setting.

After switch setting is completed, the switch inverter 155 is activated. Since the switch inverter 155 is electrically connected with the power supply/storage unit 10, switch-triggering signal generator 154 and compact motor 11, so corresponding modulations can be made to the compact motor 11 and the power supply/storage unit 10 based on the switch triggering information so that the compact motor 11 and the power supply/storage unit 10 enter the auxiliary drive mode or the energy recovery mode. In this embodiment, the switch inverter 155 may also be designed to be three-phase in accordance with the compact motor 11.

Furthermore, for the compact motor 11 and the power supply/storage unit 10 to enter the auxiliary drive mode, formula $$V_{dc} > \frac{1}{D} e_{LL}$$

needs to be satisfied, that is, the voltage of the power supply/storage unit 10 needs to be larger than the back electromotive force of the compact motor 11 divided by the duty cycle. On the other hand, the premise for the compact motor 11 and the power supply/storage unit 10 to enter the energy recovery mode, formula $$V_{dc} < \frac{1}{D} e_{LL}$$

needs to be satisfied, that is, the voltage of the power supply/storage unit 10 has to be smaller than the line-to-line back electromotive force (EMF) of the compact motor 11 divided by the duty cycle, wherein $V_{dc}$ is the voltage of the power supply/storage unit, $e_{LL}$ is the line-to-line back EMF of the motor and D is the duty cycle.

In another embodiment, for the compact motor 11 and the power supply/storage unit 10 to enter the auxiliary drive mode, formula $$V_{dc} > \frac{2}{\sqrt{3}\,M} e_{LL}$$

needs to be satisfied, that is, the voltage of the power supply/storage unit 10 has to be larger than the line-to-line back EMF of the compact motor 11 multiplied by a function value of the modulation parameter. On the other hand, the premise for the compact motor 11 and the power supply/storage unit 10 to enter the energy recovery mode, formula $$V_{dc} < \frac{2}{\sqrt{3}\,M} e_{LL}$$

needs to be satisfied, that is, the voltage of the power supply/storage unit 10 has to be smaller than the line-to-line back EMF of the compact motor 11 multiplied by a function value of the modulation parameter, wherein M is the modulation parameter.

The riding modes include an up-hill mode, a down-hill mode and a ground mode. The duty cycle or modulation parameter each has a slope corresponding to the up-hill mode, the down-hill mode and the ground mode. In this embodiment, FIG. 6 shows the duty cycle or modulation parameter for the up-hill mode; FIG. 7 shows the duty cycle or modulation parameter for the down-hill mode; and FIG. 8 shows the duty cycle or modulation parameter for the ground mode. By comparing FIGS. 6, 7 and 8, it is seen that the slope of the duty cycle or the slope of the modulation parameter for the up-hill mode can be greater than the slope of the duty cycle or the slope of the modulation parameter for the ground mode, also the slope of the duty cycle or the slope of the modulation parameter for the up-hill mode can be adjusted based on the slope of the hill. The slope of the duty cycle or the slope of the modulation parameter for the ground mode can be greater than the slope of the duty cycle or the slope of the modulation parameter for the down-hill mode. The above slopes of the duty cycle or the slopes of the modulation parameter can of course be adjusted according to user needs. It should be noted that, in another embodiment, the slope of the duty cycle or the slope of the modulation parameter for the up-hill mode can be equal to the slope of the duty cycle or the slope of the modulation parameter for the ground mode.

In addition, the switch inverter 155 may form a plurality of conduction modes using inductive elements and switching elements corresponding to the phases of the compact motor 11, so that the compact motor 11 and the power supply/storage unit 10 will enter the energy recovery mode. The specific operation is described with respect to FIGS. 9 and 10.

FIG. 9 is a graph illustrating switching of complementary switches and setting of the duty cycle. For example, the compact motor 11 has three phases: "a" phase, "b" phase and "c" phase, wherein the "a" phase and the "b" phase are the excitation phases of the compact motor 11 while the "c" phase is the non-excitation phase. The PWM counter of the switch-triggering signal generator 154 and the duty cycle or modulation parameter setter 152 generate different switch time widths for an upper arm $S_a$ and a lower arm $S'_a$. The dotted portion in the drawing will change according to the value set for the duty cycle, for example, the dotted line moves upwards when the duty cycle value is larger, and the ON time of the upper arm $S_a$ is longer than the ON time of the lower arm $S'_a$. On the contrary, the dotted line moves downwards when the duty cycle value is lower, and the ON time of the upper arm $S_a$ is shorter than the ON time of the lower arm $S'_a$. This principle applies to other conduction modes. There are a total of six conduction modes, that is, each time there are two excitation phases and one non-excitation phase.

FIG. 10 is a circuit diagram illustrating an energy recovery unit for the drive device of an electric bicycle according to this disclosure. For example, when the relationship between the power supply/storage unit 10 and the duty cycle of the complementary switches is $$V_{dc} < \frac{1}{D} e_{L-L},$$

then enter the energy recovery mode. Take one of the conduction modes as an example, when the excitation phases of the compact motor 11 are "a" and "b" phases, and the non-excitation phase is the "c" phase, the left-hand portion of FIG. 10 indicates when $S'_a$ and $S'_b$ are turned on, and the rest of the switches are turned off, then electrical energy is stored in a two-phase coil inductor; when $S_a$ and $S'_b$ are turned on, and the rest of the switches are turned off as shown in the right-hand portion of FIG. 10, then electrical energy is recharged back into the compact motor 11. The other five conduction modes can be similarly derived and thus will not be discussed in details.

Figure 11:
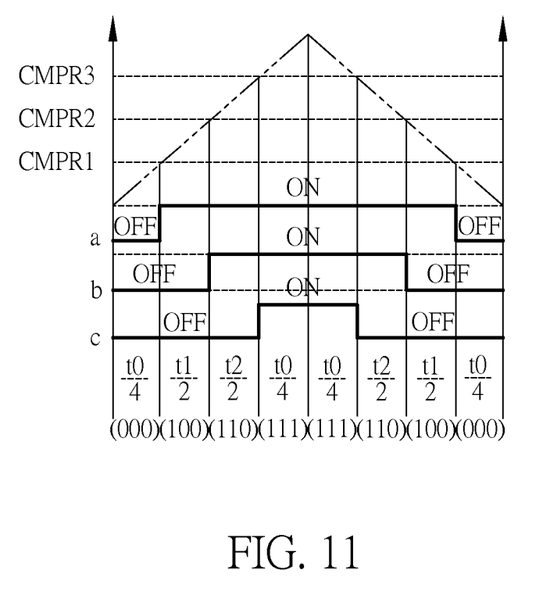
FIG. 11 is a graph illustrating switching of complementary switches and setting of the duty cycle according to another embodiment of the electric bicycle of this disclosure.

FIG. 11 is a graph illustrating switching of complementary switches and setting of the duty cycle in another embodiment. In the graph, $t_1$, $t_2$, $t_0$ are switch-on times. From the settings of $t_1$, $t_2$, $t_0$, the comparison values CMPR1, CMPR2 and CMPR3 in the module are known, and thus the PWM output waveforms can be obtained in various zones. Similar to the descriptions for FIG. 9, the PWM counter of the switch-triggering signal generator 154 and the duty cycle or modulation parameter setter 152 generate different switch time widths for the upper arms and lower arms. The dotted portion in the drawing will change according to the value set for the duty cycle; for example, the dotted line moves upwards when the duty cycle value is larger, and the ON time of the upper arm is shorter than the ON time of the lower arm. On the contrary, the dotted line moves downwards when the duty cycle value is lower, and the ON time of the upper arm is longer than the time of the lower arm. This principle applies to other conduction modes. Furthermore, (000), (100), (110) and (111) represent switch order for the upper and lower arms of the three phases. The three digits represent the "a", "b" and "c" phases, respectively, wherein "1" indicates ON for the upper arm, and "0" indicates ON for the lower arm. For example, (100) indicates the upper arm for the "a" phase is turned on, and the upper arms for the "b" and "c" phases are turned on. The switching is different from FIG. 9 in that, in each switching, all three phases will actuate and there are totally six conduction modes.

Figure 12A:
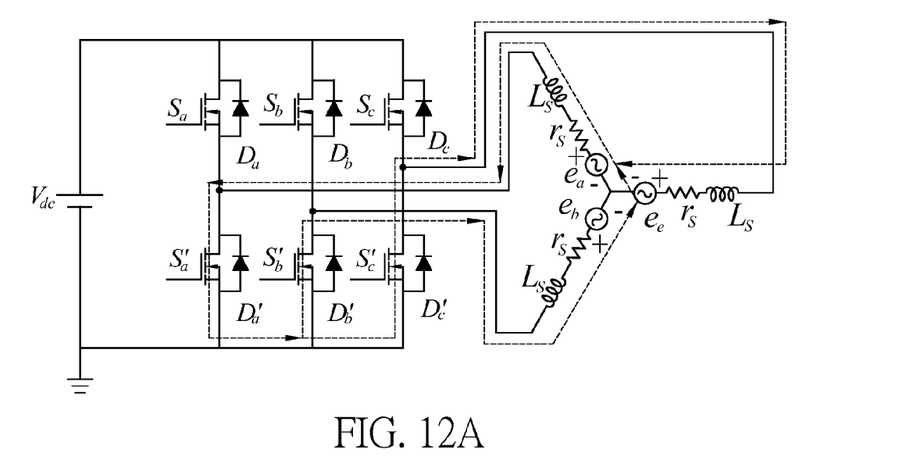
FIGS. 12A and 12B are diagrams illustrating the energy recovery circuit for the drive device of an electric bicycle according to another embodiment of this disclosure.
Figure 12B:
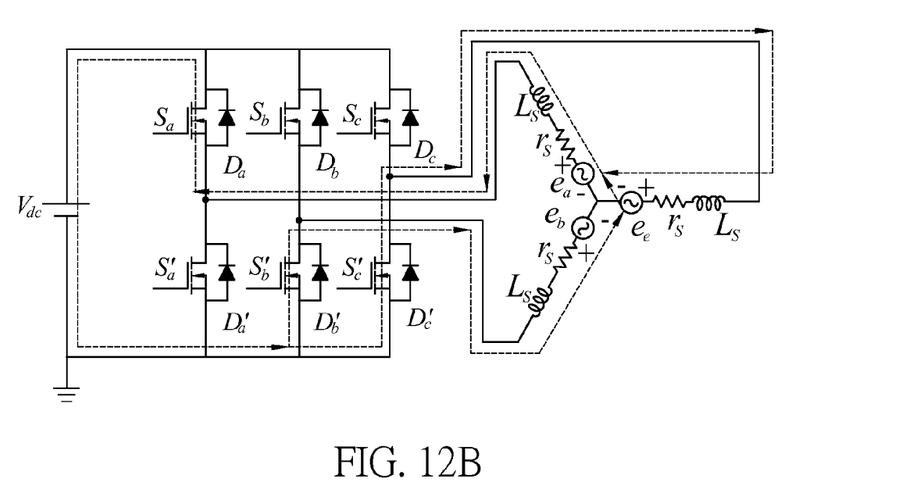

FIGS. 12A and 12B are diagrams illustrating the energy recovery circuit for the drive device of an electric bicycle according to another embodiment of this disclosure. For example, when the relationship between the power supply/storage unit 10 and the duty cycle of the complementary switches is $$V_{dc} < \frac{2}{\sqrt{3} M} e_{LL},$$

then the energy recovery mode is entered. Taking a type of switching for one of the conduction modes as an example, FIG. 12A indicates that when $S'_a$, $S'_b$ and $S'_c$ are turned on and the rest of the switches are turned off, then electrical energy is stored in the two-phase coil inductors; when $S_a$ $S'_b$ and $S'_c$ are turned on and the rest of the switches are turned off, as shown FIG. 12B, then electrical energy is recharged back into the compact motor 11. In this example, each conduction mode has six ways of switching, each of which is sequentially adopted. Taking one of the conduction modes as an example, as shown in FIG. 11, the order of switching is (000), (100), (110), (111), (111), (110), (100) and (000). The other five conduction modes and the ways of switching can be derived from this example and thus will not be discussed in details.

The other five conduction modes can be similarly derived and thus will not be repeated.

As an embodiment, a three-phase four-pole compact motor 11 is used. The three-phase switch inverter 155 may control the input voltage of the compact motor 11 to generate the current required for torque. The power supply/storage unit 10 is one or more batteries or other DC power source for providing electrical energy or performing energy recovery. The triangular wave generator 153 provides a time counter required for PWM, and when the duty cycle or modulation parameter setter 152 is compared, it can provide PWM control to the switch inverter 155. The switch-triggering signal generator 154 uses the motor position sensor 150, the triangular wave generator 153 and the duty cycle or modulation parameter setter 152 to obtain phase zone location and duty cycle magnitude and output switch triggering signals for control related to drive or energy recovery.

The pedal-rotating speed sensor 14 provides information about the speed at which the user is pedaling. The inclination sensor 12 provides inclination information of the bicycle with respect to the horizontal plane. The brake actuation sensor 13 provides information about braking. These three types of information are transmitted to the initialization/operation setter 151 as reference for the operation modes of the compact motor 11. Furthermore, the initialization/operation setter 151 can further determine the settings for the duty cycle or modulation parameter; that is, the settings for the duty cycle or modulation parameter corresponding to various switches based on the information provided by the inclination sensor 12 and the information provided by the pedal-rotating speed sensor 14. If the riding speed is greater than a predetermined limit or pedaling is stopped, then the compact motor 11 is stopped from actively outputting power.

Finally, based the above descriptions and with reference to FIG. 5, a drive control method for an electric bicycle according to this disclosure is discussed. Of course, the drive control method for an electric bicycle is applied to the electric bicycle 1 equipped with the power supply/storage unit 10 and the compact motor 11 described in the above, and the power supply/storage unit 10 and the compact motor 11 work in cooperation to drive the rotations of the wheels of the electric bicycle 1 during the auxiliary drive mode.

In step 51, it is determined, by the pedal-rotating speed sensor 14, whether the pedal-rotating speed of the electric bicycle 1 exceeds a predetermined activation condition. If the speed is determined to exceed the predetermined activation condition, then proceed to step 53; or else if the speed is determined to not exceed the predetermined activation condition, then proceed to step 52, that is, the compact motor 11 would stop driving other components. In other words, if the pedal-rotating speed of the electric bicycle 1 exceeds the predetermined activation condition, the inclination of the electric bicycle 1 with respect to the horizontal plane is detected.

In step 53, the inclination of the electric bicycle 1 with respect to the horizontal plane is detected by the inclination sensor 12. Afterwards, proceed to step 54. In step 54, it is determined whether an up-hill inclination is detected; if so, proceed to step 56 to determine the riding mode of the electric bicycle 1 is an up-hill mode; or else, proceed to step 55.

In step 55, it is determined whether a down-hill inclination is detected; if so, proceed to step 58 to determine the riding mode of the electric bicycle 1 is a down-hill mode; or else, proceed to step 57, in which a ground mode is determined to be the riding mode of the electric bicycle 1. In subsequent steps 59, 60 and 61, a corresponding duty cycle or modulation parameter is outputted depending on whether it is the up-hill mode, the ground mode or the down-hill mode. Then, proceed to step 62. In this step, the riding mode of the electric bicycle 1 is determined based on the inclination angle, and a corresponding duty cycle or modulation parameter is outputted. Of course, the riding modes include an up-hill mode, a ground mode and a down-hill mode, and the duty cycle or modulation parameter each has a slope corresponding to the up-hill mode, the ground mode and the down-hill mode, and the slope of the duty cycle or the slope of the modulation parameter for the up-hill mode can be greater than the slope of the duty cycle or the slope of the modulation parameter for the ground mode, and the slope of the duty cycle or the slope of the modulation parameter for the ground mode can be greater than the slope of the duty cycle or the slope of the modulation parameter for the down-hill mode. In another embodiment, the slope of the duty cycle or the slope of the modulation parameter for the up-hill mode is equal to the slope of the duty cycle or the slope of the modulation parameter for the ground mode.

In step 62, Hall signals are detected and outputted by the motor position sensor 150. Then, proceed to step 63. In step 63, calculations are performed based on the Hall signals, the duty cycle or modulation parameter and the predetermined time count information, thereby outputting corresponding switch triggering information to complete the settings for the switches, for example, to complete the switch settings for PWM.

In step 64, it is determined whether the condition of "the voltage of the power supply/storage unit 10 being greater than the back EMF of the compact motor 11 divided by the duty cycle" is satisfied, that is, whether the condition $$V_{dc} > \frac{1}{D} e_{LL}$$

is satisfied. If so, then proceed to step 65, in which the compact motor 11 and the power supply/storage unit 10 are instructed to enter an auxiliary drive mode. Otherwise, proceed to step 66, in which the compact motor 11 and the power supply/storage unit 10 are instructed to enter an energy recovery mode.

In another embodiment, in step 64, it is determined whether the condition of "the voltage of the power supply/storage unit 10 being greater than the line-to-line back EMF of the compact motor 11 multiplied by a function value of the modulation parameter" is satisfied, that is, whether the condition $$V_{dc} > \frac{2}{\sqrt{3}\,M} e_{LL}$$

is satisfied. If so, then proceed to step 65, in which the compact motor 11 and the power supply/storage unit 10 are instructed to enter an auxiliary drive mode. Otherwise, proceed to step 66, in which the compact motor 11 and the power supply/storage unit 10 are instructed to enter an energy recovery mode.

Of course, following steps 65 and 66, steps 67 to 70 can be optionally performed, wherein in step 67, it is determined whether the speed of the electric bicycle 1 exceeds a predetermined limit. If so, the compact motor 11 and the power supply/storage unit 10 are forced to stop driving the rotations of the wheels of the electric bicycle 1.

In step 68, it is determined whether the operation mode of the compact motor 11 and the power supply/storage unit 10 is changed, or whether the riding mode of the electric bicycle 1 is changed. If so, return to step 53 to detect the inclination of the electric bicycle 1 with respect to the horizontal plane again. Otherwise, proceed to step 69.

In step 69, it is determined whether brake actuation of the brake of the electric bicycle 1 has occurred, or pedaling of the electric bicycle 1 has stopped. If one of the above conditions is true, then the compact motor 11 and the power supply/storage unit 10 stop from driving the rotations of the wheels of the electric bicycle 1.

In summary, this disclosure performs integrated calculations using the inclination information, the brake actuation information and/or pedal-rotating speed information to allow the compact motor and the power supply/storage unit to quickly enter the auxiliary drive mode for rotating the wheels of the electric bicycle, or to enter the energy recovery mode for storing electrical energy generated by the compact motor. Compared to the prior art, this disclosure not only eliminates various shortcomings in association with the prior art that uses a torque sensing device, but also flexibly provides appropriate assistant power according to the slope of the road the electric bicycle is on, and achieves higher energy recovery rate than the prior art.

The above embodiments are only used to illustrate the principles of this disclosure, and they should not be construed as to limit this disclosure in any way. The above embodiments can be modified by those with ordinary skill in the art without departing from the scope of this disclosure as defined in the following appended claims.

What is claimed is:
1. A driving device for an electric bicycle, comprising:
 a power supply/storage unit for providing and storing electrical energy;

a compact motor provided on a wheel or a chainring of the electric bicycle and electrically connected with the power supply/storage unit;

an inclination sensor for sensing inclination information of the electric bicycle with respect to a horizontal plane when a pedal-rotating speed of the electric bicycle exceeds a predetermined activation condition;

a brake actuation sensor for sensing brake actuation information in response to braking of the electric bicycle;

a pedal-rotating speed sensor for sensing pedal-rotating speed information in response to pedaling of the electric bicycle; and a drive control module for detecting Hall signals corresponding to location status of the compact motor and performing calculations based on the Hall signals, the duty cycle and predetermined time count information or based on the Hall signals, the modulation parameter and predetermined time count information, so as to output corresponding switch triggering information for completing switch setting, and further for performing an integrated calculation based on the inclination information, the brake actuation information and the pedal-rotating speed information, and instructing, based on a result of the integrated calculation, the compact motor and the power supply/storage unit to enter an auxiliary drive mode or an energy recovery mode, wherein, in the auxiliary drive mode, the compact motor and the power supply/storage unit drive wheels of the electric bicycle, and in the energy recovery mode, the power supply/storage unit stores electrical energy generated by the compact motor.

2. The drive device for an electric bicycle of claim 1, wherein the drive control module further includes:

a motor position sensor for sensing location status of the compact motor and outputting corresponding Hall signals;

a initialization/operation setter electrically connected with the inclination sensor, the brake actuation sensor, the pedal-rotating speed sensor and the motor position sensor for determining a duty cycle or modulation parameter corresponding to a riding mode of the electric bicycle based on the inclination information and the pedal-rotating speed information, and upon receiving the brake actuation information or determining the speed of the electric bicycle is larger than a predetermined limit, stopping the compact motor and the power supply/storage unit from driving the wheels of the electric bicycle;

a duty cycle or modulation parameter setter electrically connected with the initialization/operation setter for generating corresponding duty cycle information or modulation parameter information based on the duty cycle or modulation parameter determined by the initialization/operation setter;

a triangular wave generator for outputting time count information required for pulse width modulation;

a switch-triggering signal generator electrically connected with the motor position sensor, the duty cycle or modulation parameter setter and the triangular wave generator to perform calculations based on the Hall signals, the duty cycle information and the time count information or based on the Hall signals, the modulation parameter information and the time count information, so as to output corresponding switch triggering information for completing switch setting; and a switch inverter electrically connected with the power supply/storage unit, the switch-triggering signal generator and the compact motor for making corresponding modulations to the compact motor and the power supply/storage unit based on the switch triggering information to allow the compact motor and the power supply/storage unit to enter the auxiliary drive mode or the energy recovery mode.

3. The drive device for an electric bicycle of claim 2, wherein whether the compact motor and the power supply/storage unit enter the auxiliary drive mode or the energy recovery mode is based on a comparison value of the voltage of the power supply/storage unit and the back electromotive force of the compact motor divided by of the duty cycle, or based on a comparison value of the voltage of the power supply/storage unit and the back electromotive force of the compact motor multiplied by a function value of the modulation parameter.

4. The drive device for an electric bicycle of claim 2, wherein the riding mode includes an up-hill mode, a ground mode and a down-hill mode, and the duty cycle or the modulation parameter has slopes corresponding to the up-hill mode, the ground mode and the down-hill mode.

5. The drive device for an electric bicycle of claim 4, wherein the slope of the duty cycle or the modulation parameter for the up-hill mode is greater than the slope of the duty cycle or the modulation parameter for the ground mode, and the slope of the duty cycle or the modulation parameter for the ground mode is greater than the slope of the duty cycle or the modulation parameter for the down-hill mode.

6. The drive device for an electric bicycle of claim 2, wherein the switch inverter forms a plurality of conduction modes using inductive elements and switching elements corresponding to phases of the compact motor to allow the compact motor and the power supply/storage unit to enter the energy recovery mode.

7. The drive device for an electric bicycle of claim 1, wherein the compact motor is a three-phase and four-pole permanent magnet synchronous motor and the switch inverter is a three-phase switch inverter.

8. The drive device for an electric bicycle of claim 1, wherein the pedal-rotating speed sensor is provided on a crankshaft of the electric bicycle.

9. The drive device for an electric bicycle of claim 1, wherein the power supply/storage unit, the inclination sensor, the brake actuation sensor or the drive control module is integrated into a control box, which is installed on a frame of the electric bicycle.

10. The drive device for an electric bicycle of claim 1, wherein the compact motor is provided on an axle of a front wheel or a back wheel of the electric bicycle.

11. A drive control method for an electric bicycle, which is equipped with a power supply/storage unit and a compact motor in cooperation to drive wheels of the electric bicycle, the method comprising the steps of:

(1) when a pedal-rotating speed of the electric bicycle exceeds a predetermined activation condition, detecting an inclination of the electric bicycle with respect to a horizontal plane;

(2) determining a riding mode of the electric bicycle based on the inclination angle and outputting a corresponding duty cycle or modulation parameter;

(3) detecting Hall signals corresponding to location status of the compact motor and further performing calculations based on the Hall signals, the duty cycle and predetermined time count information or based on the Hall signals, the modulation parameter and predetermined time count information, so as to output corresponding switch triggering information for completing switch setting;

(4) making corresponding modulations to the compact motor and the power supply/storage unit based on the switch triggering information to allow the compact motor and the power supply/storage unit to enter an auxiliary drive mode for driving wheels of the electric bicycle or enter an energy recovery mode for storing electrical energy generated by the compact motor.

12. The drive control method for an electric bicycle of claim 11, further comprising the steps of:

(5) determining whether the speed of the electric bicycle exceeds a predetermine limit, if so, then stopping the compact motor and the power supply/storage unit from driving the wheels of the electric bicycle; or else, proceeding to step (6);

(6) determining whether an operation mode of the compact motor and the power supply/storage unit or the riding mode of the electric bicycle is changed, if so, returning to step (1) to detect the inclination of the electric bicycle with respect to the horizontal plane; or else, proceeding to step (7);

(7) when detecting brake actuation of the electric bicycle or pedal-rotating of the electric bicycle 1 has been stopped, terminating the driving of the wheels of the electric bicycle by the compact motor and the power supply/storage unit.

13. The drive control method for an electric bicycle of claim 11, wherein the riding mode includes an up-hill mode, a ground mode and a down-hill mode, and the duty cycle or the modulation parameter has slopes corresponding to the up-hill mode, the ground mode and the down-hill mode.

14. The drive control method for an electric bicycle of claim 13, wherein the slope of the duty cycle or the modulation parameter for the up-hill mode is greater than the slope of the duty cycle or the modulation parameter for the ground mode, and the slope of the duty cycle or the modulation parameter for the ground mode is greater than the slope of the duty cycle or the modulation parameter for the down-hill mode.

15. The drive control method for an electric bicycle of claim 11, wherein, in step (3), a motor position sensor is used for detecting and outputting the Hall signals corresponding to the location status of the compact motor.

16. The drive control method for an electric bicycle of claim 11, wherein when the duty cycle is outputted in step (2), in step (4), if the voltage of the power supply/storage unit is greater than the back electromotive force of the compact motor divided by the duty cycle, then the compact motor and the power supply/storage unit enter the auxiliary drive mode; if the voltage of the power supply/storage unit is less than the back electromotive force of the compact motor divided by the duty cycle, then the compact motor and the power supply/storage unit enter the energy recovery mode.

17. The drive control method for an electric bicycle of claim 11, wherein when the modulation parameter is outputted in step (2), then in step (4), if the voltage of the power supply/storage unit is greater than the back electromotive force of the compact motor multiplied by a function value of the modulation parameter, then the compact motor and the power supply/storage unit enter the auxiliary drive mode; if the voltage of the power supply/storage unit is less than the back electromotive force of the compact motor multiplied by a function value of the modulation parameter, then the compact motor and the power supply/storage unit enter the energy recovery mode.

18. The drive control method for an electric bicycle of claim 11, wherein the compact motor is provided on a wheel or a chainring of the electric bicycle.

19. The drive control method for an electric bicycle of claim 18, wherein the compact motor is provided on an axle of a front wheel or a back wheel of the electric bicycle.

* * * * *